United States Patent
Ebling

(10) Patent No.: US 9,823,343 B2
(45) Date of Patent: Nov. 21, 2017

(54) DIGITAL BEAMFORMING BASED RESOLUTION OF OUT-OF-PATH TARGETS SHOWING UP AS IN-PATH DUE TO GRATING LOBES IN ARRAY ANTENNA RADARS

(71) Applicant: Ford Global Technologies, LLC, Dearborn, MI (US)

(72) Inventor: James Paul Ebling, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 335 days.

(21) Appl. No.: 14/633,958

(22) Filed: Feb. 27, 2015

(65) Prior Publication Data

US 2016/0252608 A1 Sep. 1, 2016

(51) Int. Cl.
*G01S 13/44* (2006.01)
*G01S 13/93* (2006.01)

(52) U.S. Cl.
CPC ........ *G01S 13/4454* (2013.01); *G01S 13/931* (2013.01)

(58) Field of Classification Search
CPC ............................ G01S 13/4454; G01S 13/931
USPC ......................................................... 342/149
See application file for complete search history.

(56) References Cited

U.S. PATENT DOCUMENTS

| 6,067,048 | A | 5/2000 | Yamada |
| 7,298,333 | B2 | 11/2007 | Iluz et al. |
| 9,395,727 | B1 * | 7/2016 | Smith ................. G05D 1/0257 |
| 2009/0015463 | A1 * | 1/2009 | Tschernitz ............. G01S 7/036 342/146 |
| 2013/0088393 | A1 | 4/2013 | Lee et al. |
| 2013/0176173 | A1 | 7/2013 | Chew et al. |

FOREIGN PATENT DOCUMENTS

IN 2012DE01357 A 5/2012

* cited by examiner

*Primary Examiner* — Timothy A Brainard
(74) *Attorney, Agent, or Firm* — Frank A. MacKenzie; Brooks Kushman P.C.

(57) ABSTRACT

An antenna system, such as a radar antenna system, includes an array of antenna elements and a controller. The controller outputs an in-path indicator in response to an angle of arrival for a target being less than a threshold angle for a given range to the target. The angle of arrival is based on a differential phase angle derived from data defining first and second composite signal returns from the target associated with first and second apertures respectively, and a phase center offset between the apertures. The first and second apertures are formed from first and second subsets of the antenna elements respectively.

16 Claims, 4 Drawing Sheets

DIGITAL BEAMFORMING BASED RESOLUTION OF OUT-OF-PATH TARGETS SHOWING UP AS IN-PATH DUE TO GRATING LOBES IN ARRAY ANTENNA RADARS

TECHNICAL FIELD

This disclosure relates to array antenna radars.

BACKGROUND

Beamforming is the combination of radio signals from a set of non-directional antennas to simulate a directional antenna. The simulated antenna can be pointed electronically, although the antenna does not physically move. In communications, beamforming is used to point an antenna at the signal source to reduce interference and improve communication quality. In direction finding applications, beamforming can be used to steer an antenna to determine the direction of the signal source.

SUMMARY

A method of resolving grating lobe detection includes, by a controller, sampling output indicative of signal return from a target from each of a plurality of antenna elements, combining the output from a first subset of the antenna elements selected to form a first aperture to define a first composite signal return from the target for the first aperture, and combining the output from a second subset of the antenna elements selected to form a second aperture to define a second composite signal return from the target for the second aperture. The method further includes, by the controller, processing the outputs defining the first and second composite signal returns to identify a differential phase angle between the first and second composite signal returns, defining an angle of arrival for the target based on the differential phase angle and a phase center offset between the apertures, and outputting an in-path indicator in response to the angle of arrival being less than a threshold angle for a given range to the target.

An antenna system includes an array of antenna elements and a controller. The controller, in response to an angle of arrival for a target being less than a threshold angle for a given range to the target, outputs an in-path indicator. The angle of arrival is based on a differential phase angle derived from data defining first and second composite signal returns from the target associated with first and second apertures respectively, and a phase center offset between the apertures. The first and second apertures are formed from first and second subsets of the antenna elements respectively.

A vehicle includes an array of antenna elements and a controller. The controller selectively outputs in-path indicators based on phase monopulse processing of output defining first and second composite signal returns from respective first and second apertures each formed from a different subset of the antenna elements. The first and second composite signal returns are each indicative of a main lobe or a grating lobe.

DETAILED DESCRIPTION

Figure 1:
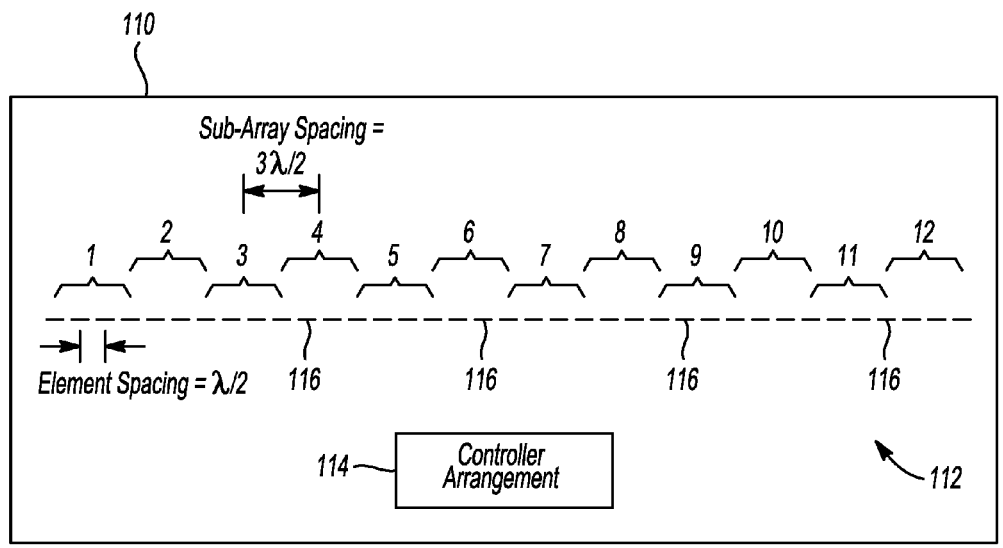
FIG. 1 is a schematic diagram of a vehicle including an array of sub-arrays for use in digital beam forming.

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention.

Array antennas are commonly used in radar systems, and in particular, automotive radar systems. (These systems often employ pulse Doppler processing with digital beamforming (DBF).) Many current and legacy systems use this type of antenna in order to take advantage of its thin profile and efficient radiation. Further, in utilizing multiple receive channels from individual elements, or groups of elements (so called sub-arrays), DBF techniques can be applied to form beams in multiple directions simultaneously by applying different complex weights to the same data set.

In forming the array, elements must be spaced less than one half wavelength of the highest frequency of interest in order to avoid what are termed grating lobes. These lobes are essentially replicas of the main beam that appear at an angle that is proportional to the undersampling factor. In essence, when the array is spatially undersampled, the grating lobes appear.

There are various reasons for not spacing the elements at less than one half wavelength. One reason is that in order for an element to be an effective radiator, it should be at least one quarter wavelength in extent. Spacing such radiating elements at one half wavelength can prove difficult, and can also result in undesirable coupling between adjacent elements, adversely affecting the overall beam pattern. Also, if DBF techniques are going to be employed, there is a limit to the number of channels that can be supported in the receiver, which in turn limits the overall size of the array, and hence the beamwidth and gain that can be realized. Further, so-called subarrays are employed which are a subgrouping of elements, and these may not be easily overlapped which puts the effective element spacing again at greater than one half wavelength—even if the actual element to element spacing is less than one half wavelength. So, in many cases the effective element spacing is greater than one half wavelength, with every effort made to have the spacing selected in order to put the grating lobes outside the field of view (FOV) of interest, which is necessarily less than 180 degrees in most cases.

Unfortunately, just because the grating lobes are not within the FOV of interest does not make them immune to picking up returns from objects outside of the FOV. Objects picked up by a grating lobe (or any sidelobe, for that matter) would be indiscernible from an object picked up in the main lobe of the antenna beam and hence could erroneously appear to be an object of interest.

One means of mitigating grating lobes that is often employed in automotive radar systems involves using separate transmit and receive antennas. In this technique, the transmit antenna beam is typically designed to illuminate the FOV of interest, while DBF is employed on the receive antenna to form narrow, higher gain beams in multiple directions covering the FOV of interest. The transmit beam is further designed such that the nulls in its pattern correspond to the position of the grating lobes in the receive beams. This is fairly effective, but objects with large radar cross section can still be detected by the grating lobes, and require further mitigation.

Amplitude weighting applied as part of the DBF process can help reduce the magnitude of the grating lobes, but care must be exercised as some complex weights can exacerbate the grating lobes. Also, this in combination with the transmit beam nulling mentioned above can be effective. Unfortunately, some large radar cross-section (RCS) targets can still be detected in the grating lobe, and further mitigating techniques are required.

Subarrays are typically used to give an effective element pattern that helps to control the grating lobe. Even though the spacing of the subarrays can cause more serious grating lobes, the roll-off of the resultant subarray pattern (which is the effective element pattern for the array of subarrays) can be very effective in controlling the grating lobes.

Certain techniques of mitigating grating lobe (or generally, sidelobe) detections proposed herein take advantage of the DBF technique. Since the multi-channel receive data is available to the processor, different weightings can be applied. Thus in an array of N elements (or subarrays), one can apply weighting to the elements such that one of the elements is effectively removed from the array, forming an array that is smaller by one element (or subarray). This will have a slightly wider beamwidth due to the smaller array size, but since the element (or subarray) spacing is the same, the grating lobes will occur at the same angular locations. So, a target in the original full array antenna grating lobe will also be located in the grating lobe of the synthesized smaller array beam pattern.

Now, if a smaller array (a sub-aperture) is synthesized utilizing the elements (or subarrays) 1 through N−1, and another sub-aperture is formed using the elements (or sub-arrays) 2 through N that is the same size as the first sub-aperture N−1 element array, the two arrays will have grating lobes in the same angular position. Thus, a target detection coming from the grating lobe in one sub-aperture will also be detected in the grating lobe of the other sub-aperture. The detected grating lobe target, being off center from the direction of interest (the main beam pointing angle), will have a phase difference that is proportional to the offset of the phase centers of the two sub-apertures, and the angle off of the direction of interest. In effect, two monopulse receive arrays are being synthesized via DBF, and by applying monopulse techniques, a detection coming from the grating lobes can be eliminated from consideration as being in the direction of interest, thus eliminating false countermeasure activations.

This technique may be relatively low cost in terms of processing since it can be selectively applied only in instances of detection of in-path threats. Also, the processing would only need be applied to detection data within the range/Doppler bins where the in-path object is being indicated. Further, the weights for the synthesized smaller arrays could be pre-determined so that a simple look-up table could be employed for efficient calculation.

As an extension to this method, the original beam formed using all N elements can be included along with the two sub-apertures discussed above that employ N−1 elements in order to establish a phase progression of the target of interest. A slope of this phase progression that is above a threshold would indicate it is not actually in the path of the radar (vehicle).

If the amplitude of the target is such that it is marginally detected in the sub-apertures using N−1 elements, it still may be possible to perform a monopulse determination of in- or out-of-path utilizing the original full aperture beam (all N elements) along with one of the sub-apertures formed with the N−1 elements as long as it is detected in at least one of the N−1 element sub-apertures. (If the target is in-path, the phase angle associated with the target should be largely equal in all beams formed. Differences in the phase angle from one beam to the next would indicate that the target is actually out of path and can be disregarded.)

Further, if the amplitude of the target is sufficiently large, the mere lack of a detection in the same range/Doppler bin in the sub-apertures would be enough to rule it out as an in-path target since targets of sufficient amplitude should certainly be detected in the main beam of the subarray. Sufficient amplitude would be the difference in gain between the original and sub-aperture above the detection threshold of the original beam.

As an example of an implementation, we will consider an automotive vehicle 110 including an automotive radar system 112. The automotive radar system 112 includes a controller arrangement 114 in communication with antenna elements 116 forming an array, and utilizes a flood transmit beam (beam illuminates the entire intended FOV). The array, in this example, is a uniform linear array (ULA) receive antenna employing DBF. The receive array has a fixed elevation beam, and the multiple beams formed through DBF are realized by multiple receive channels in the azimuth direction (hence beam steering is limited to the azimuth direction). The array in this case will have azimuth element spacing of one half wavelength, but the elements 116 will be combined into sub-arrays of 4 elements, with each sub-array sharing one element with the neighboring sub-array (the sub-arrays have a one element overlap), resulting in the sub-arrays having a phase center spacing of 3/2 wavelengths. (Sub-arrays, of course, can have any desired number of elements, such as 1, 2, 5, etc., and share any desired number of elements.) The array here will incorporate 12 sub-arrays (numbered 1 through 12). The azimuth direction is left/right across the page, with the elevation direction being into/out of the page. The resulting antenna pattern would be from the array towards the top of the page.

Figure 2:
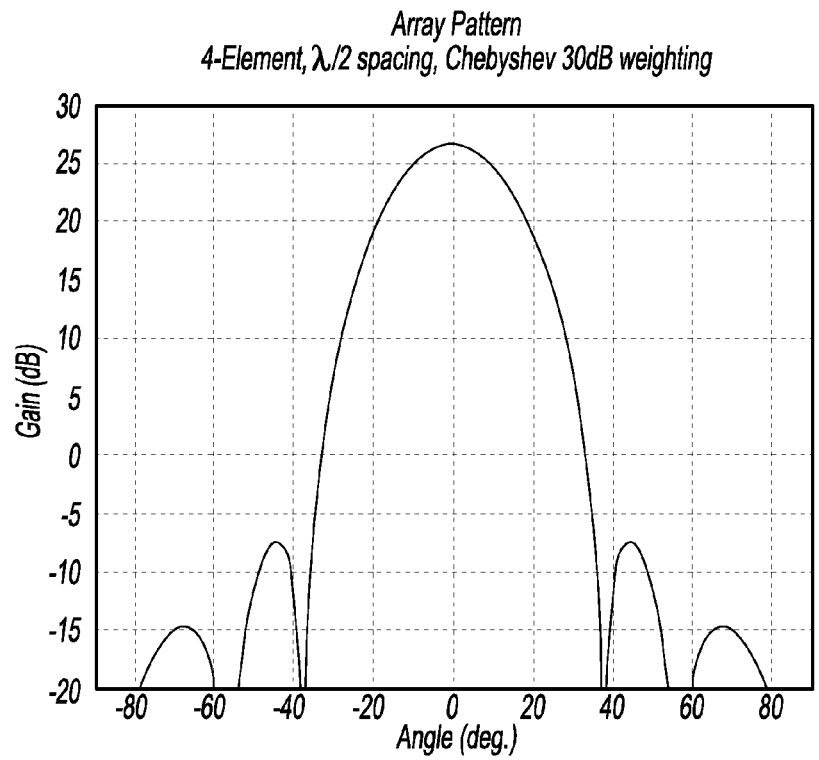
FIG. 2 is a gain versus angle beam pattern for a four element array with $\lambda/2$ spacing and Chebyshev 30 dB weighting.

Note that the sub-arrays are formed in the feed structure and have a hardware determined amplitude weighting applied in order to help control the sidelobe levels in the resulting sub-array patterns (this helps to control grating lobe levels). The weighting in this case is a Chebyshev window with 30 dB relative sidelobe attenuation, and the resulting sub-array pattern is shown in FIG. 2.

Figure 3:
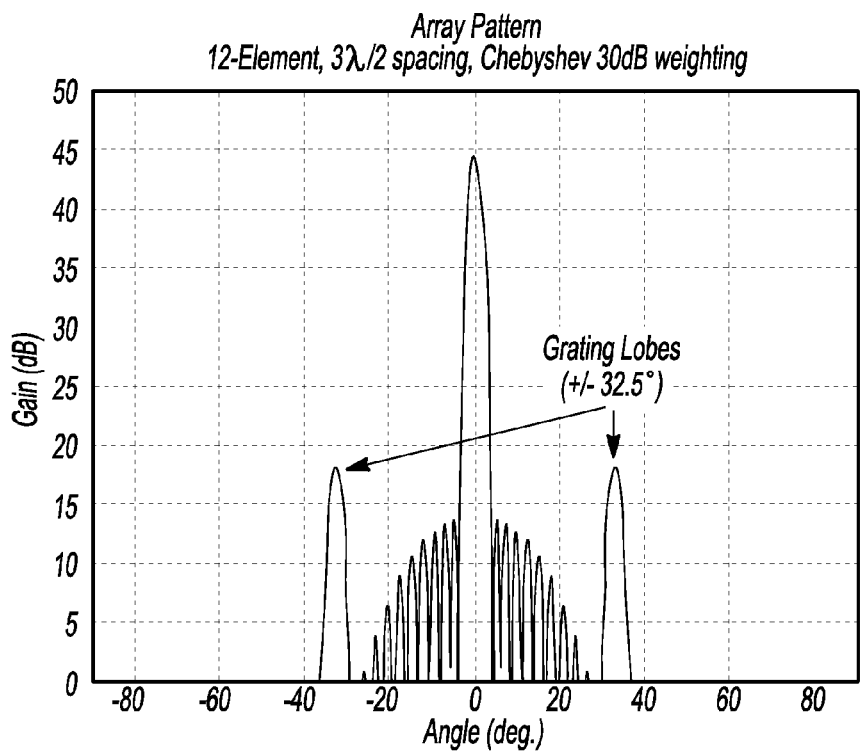
FIG. 3 is a gain versus angle beam pattern for a twelve element array with $3\lambda/2$ spacing and Chebyshev 30 dB weighting.

Now, the straight ahead (0 degree) beam formed by the 12 sub-arrays combined using DBF and, again, a Chebyshev weighting with 30 dB sidelobe attenuation is shown in FIG. 3. Note the grating lobes at +/−32.5 degrees.

Figure 4:
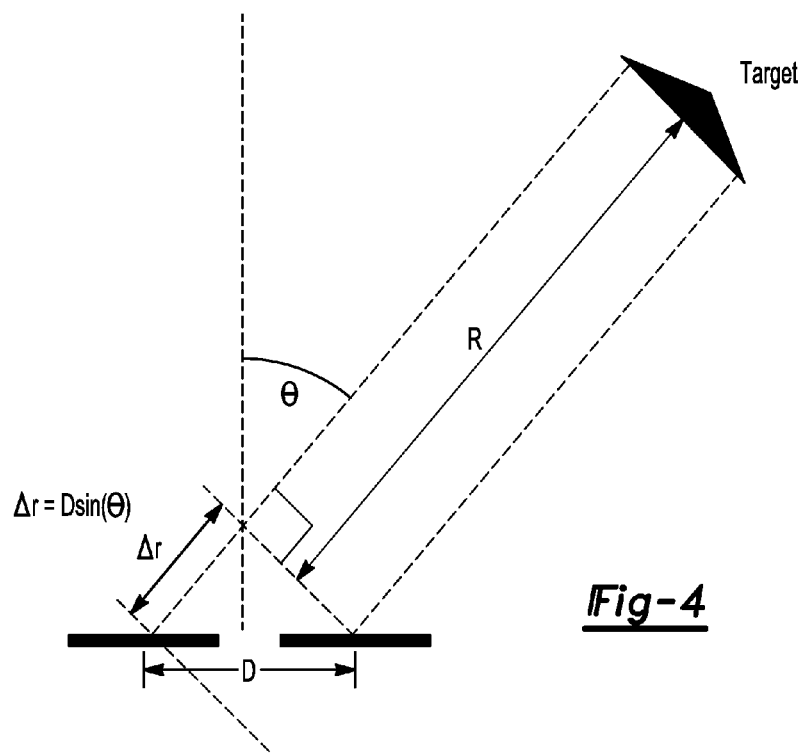
FIG. 4 is a schematic diagram of monopulse geometry.

In a monopulse antenna, the general idea is that two basically identical apertures with physically offset phase centers are utilized to estimate the angle to a target. This is depicted in FIG. 4.

If one considers a target at an angle θ as shown, the distance from one aperture phase center to the target will differ from the distance from the other aperture phase center to the target by an amount that is a function of the spacing of the aperture phase centers (D). It is assumed that the overall target distance is very large relative to the aperture phase center spacing (D), and as such the difference in range to the target can be estimated by $$\Delta r = D \sin \theta$$

Note that when θ=0, Δr=0.

Also note that in order to keep the overall physical aperture of reasonable size, as well as to avoid phase ambiguities for relatively large angles of interest, the range difference is small compared to a range resolution cell. Hence, this range difference cannot be measured directly by the radar. Instead, the range difference imparts a phase difference in the return signals from the two apertures that is directly proportional to the range difference.

Figure 5:
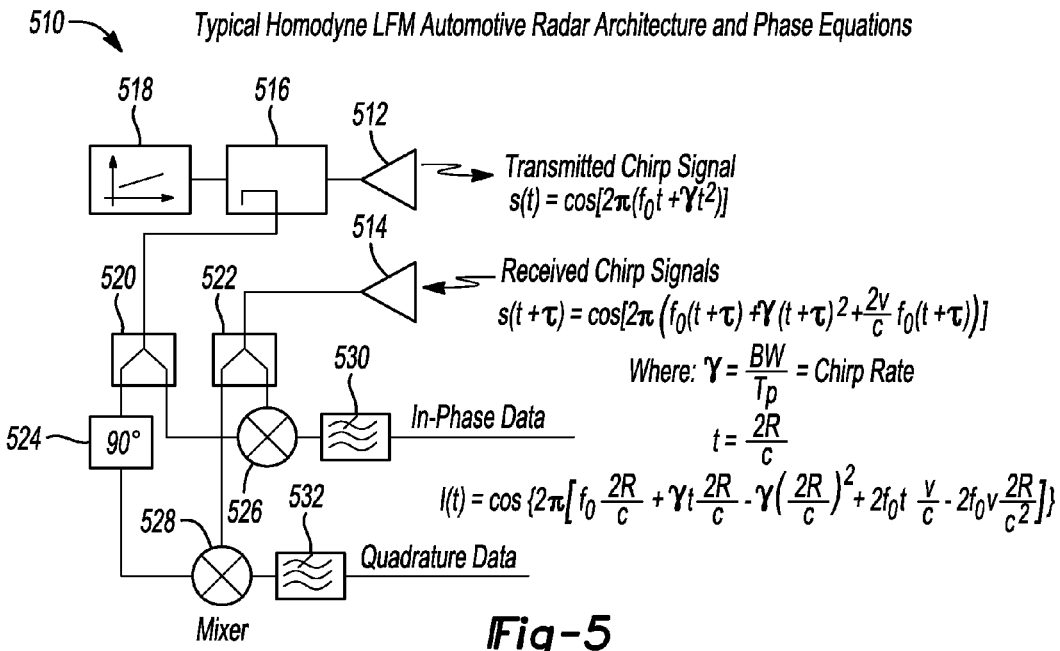
FIG. 5 is a schematic diagram of typical homodyne automotive radar architecture and associated signal-phase equations for linear FM modulation.

FIG. 5 shows a homodyne architecture that is very common for an automotive radar system 510, along with the baseband phase of a signal from a target at range R with relative velocity v for linear chirp modulation. In this example, the automotive radar system 510 includes antennae 512, 514, a coupler 516, a voltage controlled oscillator 518, power splitters 520, 522, phase shifter 524, mixers 526, 528, and low pass filters 530, 532. The voltage controlled oscillator 518 and antenna 512 are arranged such that the antenna transmits a chirp signal. The coupler 516, which is disposed between the voltage controlled oscillator 518 and antenna 512, directs the signal to the power splitter 520. Output from the power splitter 520 is directed to the phase shifter 524 and mixer 526. Output from the phase shifter 524 is directed to the mixer 528. The antenna 514 directs received chirp signals to the power splitter 522. Output from the power splitter 522 is directed to the mixers 526, 528. Output from the mixers 526, 528 is directed to the low pass filters 530, 532 respectively. As a result, the phase of the return signal for a target at range R is $$\phi_R = 2\pi \left[ f_0 \frac{2R}{c} + \gamma t \frac{2R}{c} - \gamma \left(\frac{2R}{c}\right)^2 + 2f_0 t \frac{v}{c} - 2f_0 v \frac{2R}{c^2} \right]$$

And the return signal phase for the same target at range R+Δr (with the same relative velocity) is $$\phi_{R+\Delta r} = 2\pi \left[ f_0 \frac{2(R+\Delta r)}{c} + \gamma t \frac{2(R+\Delta r)}{c} - \gamma \left(\frac{2(R+\Delta r)}{c}\right)^2 + 2f_0 t \frac{v}{c} - 2f_0 v \frac{2(R+\Delta r)}{c^2} \right]$$

The phase difference between these two return signals is then $$\Delta \phi = \phi_{R+\Delta r} - \phi_R$$

-continued $$\Delta \phi = 2\pi \left[ \frac{2f_0 \Delta r}{c} + \frac{2\gamma t \Delta r}{c} - \frac{8\gamma R \Delta r}{c^2} - \frac{4\gamma \Delta r^2}{c^2} - \frac{4f_0 v \Delta r}{c^2} \right]$$

Substituting D sin θ for Δr gives $$\Delta \phi = 2\pi \left[ \frac{2f_0 D \sin(\theta)}{c} + \frac{2\gamma t D \sin(\theta)}{c} - \frac{8\gamma R D \sin(\theta)}{c^2} - \frac{4\gamma [D \sin(\theta)]^2}{c^2} - \frac{4f_0 v D \sin(\theta)}{c^2} \right]$$

which directly relates the angle to the target to the phase difference between the return signals from the two monopulse apertures. The above can be simplified by ignoring the extremely tiny contributions from the $c^2$ terms, so that we have $$\Delta \phi = \frac{4\pi D \sin(\theta)}{c} [f_0 + \gamma t]$$

and $$\theta = \sin^{-1}\left[\frac{c \Delta \phi}{4\pi D (f_0 + \gamma t)}\right]$$

Figure 6:
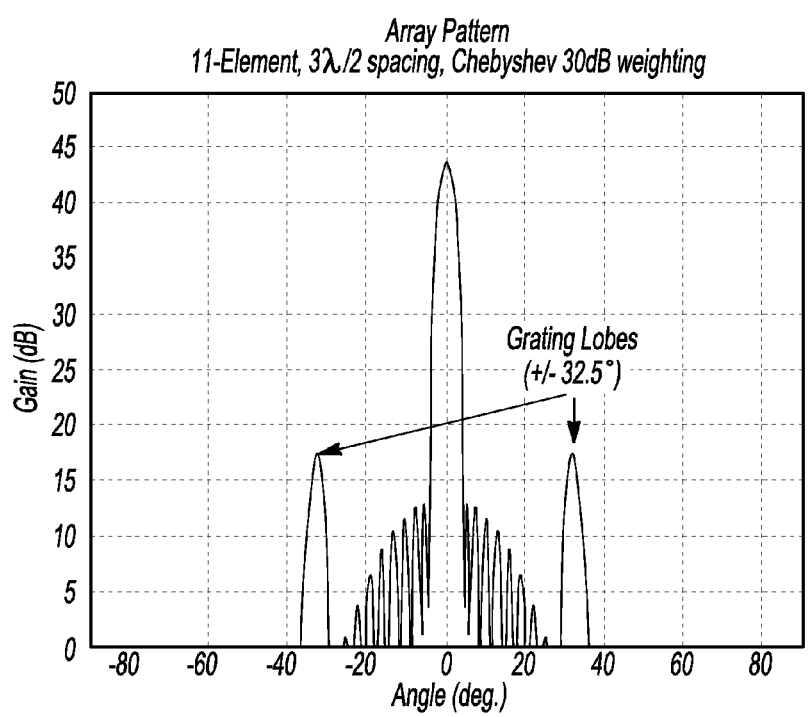
FIG. 6 is a gain versus angle beam pattern for an eleven element array with $3\lambda/2$ spacing and Chebyshev 30 dB weighting.

From the single aperture employing DBF, two effectively separate apertures can be formed by applying appropriate weightings. In the current twelve element aperture example, referring to FIG. 1, a weighting for an eleven element array can be applied to sub-arrays 1 through 11, while weighting sub-array 12 to be zero. The same eleven element weighting can then be applied to sub-arrays 2 through 12 while weighting sub-array 1 to be zero. (The beams formed in each case will point in the same direction and have a phase center offset of one sub-array spacing (3λ/2). The pattern for a beam at 0 degrees formed from an eleven element Chebyshev 30 dB weighting is shown in FIG. 6. Note that the grating lobes are in the same relative position at +/−32.5 degrees as the twelve element weighted beam in FIG. 3 so that targets in the grating lobes of the twelve element array beam will also show up in the grating lobes of the eleven element beam.

In other examples, weightings can be applied so that the apertures are formed from differing numbers of sub-arrays, or so that the apertures are formed from every other sub-array (e.g., sub-arrays 1, 3, 5, 7, 9 and 11). Other scenarios are also possible.

It should be realized that this technique could be extended such that the spacing (D) between the formed beams can be adjusted. For example, a beam can formed utilizing sub-arrays 1 through 10, while weighting sub-arrays 11 and 12 as zero. Then sub-arrays 3 through 12 can have the same beam weighting applied while setting the weightings for sub-arrays 1 and 2 to zero. This would result in an aperture spacing (D) of two sub-array spacings (3λ). Further, one could also apply the same beam weighting to sub-arrays 2 through 11 to form a third aperture. The aperture-to-aperture spacing in this case would be one sub-array spacing (3λ/2). However, there would be two phase differences that should have a linear progression that could prove useful for estimating the angle to the target.

Applying weighting functions to the elements of the DBF array would not require extraordinary additional processing as the weighting functions could be generated a priori and stored in a look-up table. Also, the weightings would be applied to the same sets of collected data, so no new data need be collected. Finally, this technique may, in certain instances, only be invoked when a potential collision with a target is indicated, and would only be applied to the particular range and Doppler bins where that target is detected.

Figure 7:
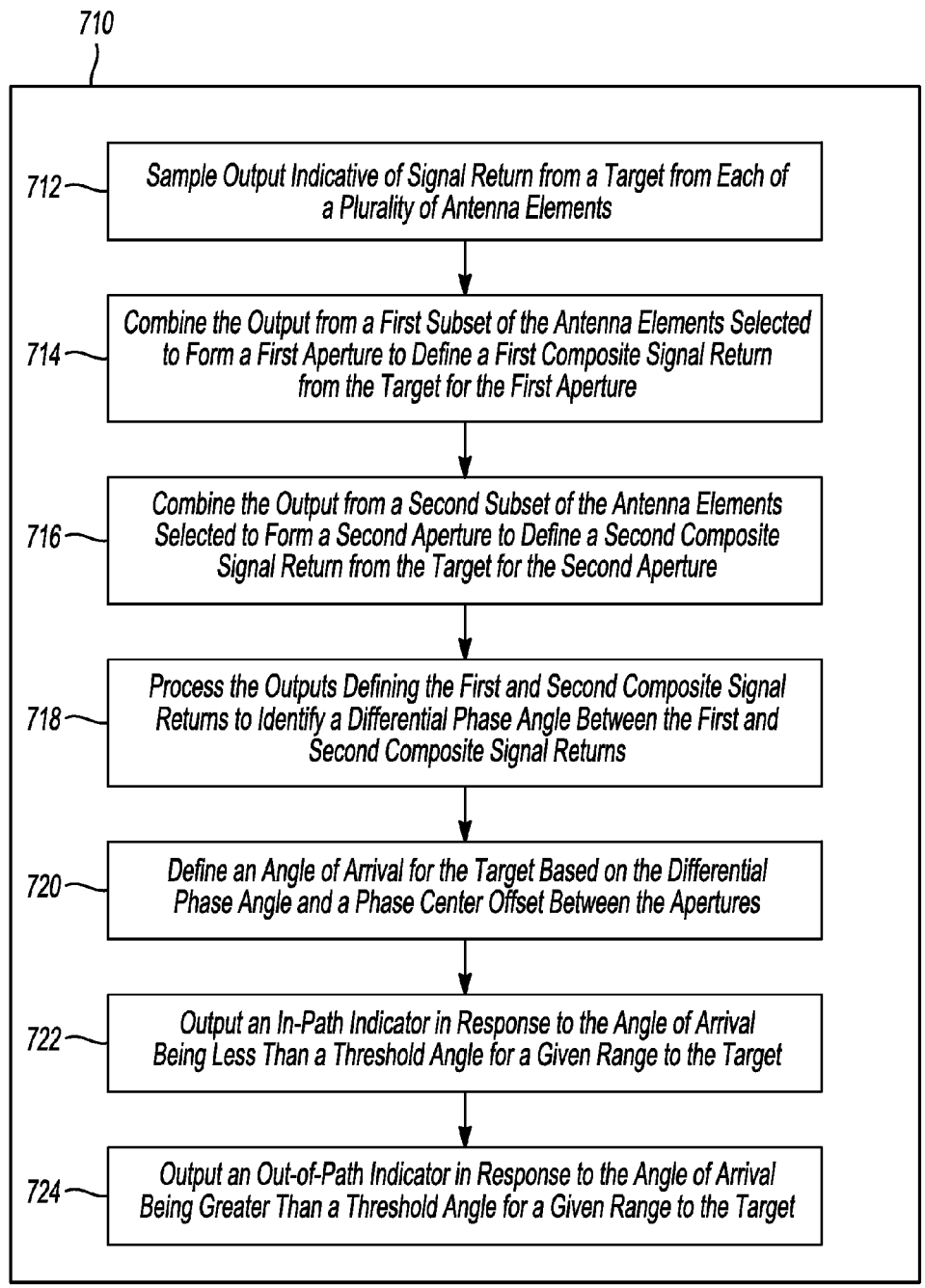
FIG. 7 is a flow chart of an algorithm for resolving whether composite signal returns are indicative of a main lobe or a grating lobe.

With reference to FIG. 7, a controller 710 of a radar antenna system may perform operations to resolve whether signal returns from a target result from a main lobe or a grating lobe. Although the operations are discussed in sequence, some may be performed at the same time, in a different order, or omitted. At operation 712, output indicative of signal return from a target from each of a plurality of antenna elements is sampled. At operation 714, the output from a first subset of the antenna elements selected to form a first aperture to define a first composite signal return from the target for the first aperture is combined. At operation 716, the output from a second subset of the antenna elements selected to form a second aperture to define a second composite signal return from the target for the second aperture is combined. At operation 718, the outputs defining the first and second composite signal returns are processed to identify a differential phase angle between the first and second composite signal returns. At operation 720, an angle of arrival for the target is defined based on the differential phase angle and a phase center offset between the apertures. At operation 722, an in-path indicator is output in response to the angle of arrival being less than a threshold angle for a given range to the target (e.g., 11° for 5 meters, 6° for 10 meters, etc.). At operation 724, an out-of-path indicator is output in response to the angle of arrival being greater than a threshold angle for a given range to the target. (The threshold angle may generally depend on a range to the target and a predicted path of the vehicle.)

The processes, methods, or algorithms disclosed herein may be deliverable to or implemented by a processing device, controller, or computer, which may include any existing programmable electronic control unit or dedicated electronic control unit. Similarly, the processes, methods, or algorithms may be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms may also be implemented in a software executable object. Alternatively, the processes, methods, or algorithms may be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

The words used in the specification are words of description rather than limitation, and it is understood that various changes may be made without departing from the spirit and scope of the disclosure. As previously described, the features of various embodiments may be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and may be desirable for particular applications.

What is claimed is:

1. A method of resolving grating lobe detection comprising:
by a controller,
sampling output indicative of signal return from a target from each of a plurality of antenna elements,
combining the output from a first subset of the antenna elements selected to form a first aperture to define a first composite signal return from the target for the first aperture,
combining the output from a second subset of the antenna elements selected to form a second aperture to define a second composite signal return from the target for the second aperture,
processing the outputs defining the first and second composite signal returns to identify a differential phase angle between the first and second composite signal returns,
defining an angle of arrival for the target based on the differential phase angle and a phase center offset between the apertures, and
outputting an in-path indicator in response to the angle of arrival being less than a threshold angle for a given range to the target.

2. The method of claim 1 further comprising outputting an out-of-path indicator in response to the angle of arrival being greater than the threshold angle.

3. The method of claim 1, wherein the apertures have a same number of antenna elements.

4. The method of claim 1, wherein the differential phase angle is proportional to an angular direction to the target relative to a bore sight of the apertures.

5. An antenna system comprising:
an array of antenna elements; and
a controller programmed to, in response to an angle of arrival for a target being less than a threshold angle for a given range to the target, output an in-path indicator, wherein the angle of arrival is based on (i) a differential phase angle derived from data defining first and second composite signal returns from the target associated with first and second apertures respectively, the first and second apertures being formed from first and second subsets of the antenna elements respectively, and (ii) a phase center offset between the apertures.

6. The system of claim 5, wherein the controller is further programmed to, in response to the angle of arrival being greater than the threshold angle, output an out-of-path indicator.

7. The system of claim 5, wherein the apertures are formed from a same number of the antenna elements.

8. The system of claim 5, wherein the apertures are formed from different numbers of the antenna elements.

9. The system of claim 5, wherein the antenna elements forming the first aperture are adjacent to each other and wherein the antenna elements forming the second aperture are adjacent to each other.

10. The system of claim 5, wherein the differential phase angle is proportional to an angular direction to the target relative to a bore sight of the apertures.

11. The system of claim 5, wherein the controller is further programed to perform phase monopulse processing of the data to derive the differential phase angle.

12. A vehicle comprising:
an array of antenna elements; and
a controller programmed to, responsive to an angle of arrival for a target being less than a threshold angle for a given range to the target, output an in-path indicator, the angle of arrival being based on phase monopulse processing of output defining first and second composite signal returns from respective first and second apertures each formed from a different subset of the antenna elements.

13. The vehicle of claim 12, wherein the subsets are such that the apertures have a phase center offset therebetween.

14. The vehicle of claim 12, wherein the apertures are formed from a same number of the antenna elements.

15. The vehicle of claim 12, wherein the apertures are formed from a different number of the antenna elements.

16. The vehicle of claim 12, wherein the antenna elements forming the first aperture are adjacent to each other and wherein the antenna elements forming the second aperture are adjacent to each other.

* * * * *